(12) United States Patent
Lane et al.

(10) Patent No.: US 7,592,059 B2
(45) Date of Patent: Sep. 22, 2009

(54) LIGHTWEIGHT, COMPOSITE STRUCTURAL RAILROAD TIES

(76) Inventors: Kevin K. Lane, Fort Collins, CO (US); Dustin K. Lane, legal representative, 5186 Longs Peak Rd., Unit 1, Berthoud, CO (US) 80534; Paul A. Carothers, 400 Cedar Hill La., Arcata, CA (US) 95521-8909; Ryan K. Lane, 5220 Boardwalk Dr., No. A14, Fort Collins, CO (US) 80524; Ryan P. Faino, 451 Boardwalk Dr., #206, Ft. Collins, CO (US) 80525

( * ) Notice: Subject to any disclaimer, the term of this patent is extended or adjusted under 35 U.S.C. 154(b) by 126 days.

(21) Appl. No.: 11/504,394

(22) Filed: Aug. 15, 2006

(65) Prior Publication Data

US 2007/0040293 A1 Feb. 22, 2007

Related U.S. Application Data

(60) Provisional application No. 60/708,568, filed on Aug. 16, 2005.

(51) Int. Cl.
*B32B 3/00* (2006.01)

(52) U.S. Cl. .............. 428/71; 428/68; 428/76; 428/131; 428/543; 428/319.1; 428/319.3; 428/319.7; 52/309.4; 52/309.8; 52/309.9

(58) Field of Classification Search .............. 428/68, 428/71, 76, 543, 319.1, 319.3, 319.7, 131; 52/309.4, 309.8, 309.9
See application file for complete search history.

(56) References Cited

U.S. PATENT DOCUMENTS

| | | | |
|---|---|---|---|
| 3,704,861 A * | 12/1972 | Glaesener | 256/13.1 |
| 3,813,040 A | 5/1974 | Heinemeyer | |
| 4,083,491 A | 4/1978 | Hill | |
| 4,113,177 A | 9/1978 | Collins et al. | |
| 4,212,461 A | 7/1980 | Cecka et al. | |
| 4,652,495 A | 3/1987 | Sato et al. | |

(Continued)

FOREIGN PATENT DOCUMENTS

EP 0486465 A1 5/1992

(Continued)

OTHER PUBLICATIONS

Envirocoat Installation Company, Professional Polyurea Coating information, 2004, 2 pages, printed Jun. 20, 2005 from www.envirocoating.com.

(Continued)

*Primary Examiner*—Hai Vo
(74) *Attorney, Agent, or Firm*—Fliesler Meyer LLP

(57) ABSTRACT

A lightweight, reinforced composite structural element is disclosed, which includes a hollow housing, interior reinforcement, a filling of polyurethane foam, and a substantially uniform outer coating of a high-solid protective coating. The reinforced composite structural element can be used as a railroad tie and for other construction uses. The structural element is formed with a housing having end caps or ends sealed by flaps that are connected with and bendable from the housing material to create a sealed container with openings for injection of the foam into cavities of the housing formed by the interior reinforcement.

16 Claims, 8 Drawing Sheets

U.S. PATENT DOCUMENTS

| | | | | |
|---|---|---|---|---|
| 4,856,655 A | * | 8/1989 | Barsky | 206/524 |
| 5,022,211 A | * | 6/1991 | Scott | 52/846 |
| 5,100,601 A | | 3/1992 | Heggenstaller et al. | |
| 5,128,174 A | | 7/1992 | Brotz | |
| 5,713,518 A | | 2/1998 | Fox et al. | |
| 5,862,642 A | * | 1/1999 | Erwin | 52/834 |
| 6,179,215 B1 | | 1/2001 | Shea | |
| 6,235,367 B1 | | 5/2001 | Holmes et al. | |
| 6,668,495 B1 | * | 12/2003 | Prince | 52/63 |
| 2002/0053179 A1 | * | 5/2002 | Wycech | 52/721.4 |
| 2002/0095904 A1 | * | 7/2002 | Fingerson et al. | 52/736.2 |

FOREIGN PATENT DOCUMENTS

| | | |
|---|---|---|
| JP | 406041901 A | 2/1994 |

OTHER PUBLICATIONS

Polyurea Development Association, What is Polyurea?, 2005, 2 pages, printed Jun. 20, 2005 from www.pda-online.irg/pda_resources/whatispoly.asp.

EPOXY.COM, description of EpoxySystems' Product #312-Sprayable Aliphatic Polyurea Coating, 2005, 4 pages, printed Jun. 20, 2005 from www.epoxysystems.com/312.htm.

International Search Report, with Written Opinion, dated Mar. 30, 2007 for International Appl. No. PCT/US2006/031947.

International Preliminary Examination Report dated Feb. 28, 2008 for International Appl. No. PCT/US2006/031947.

* cited by examiner

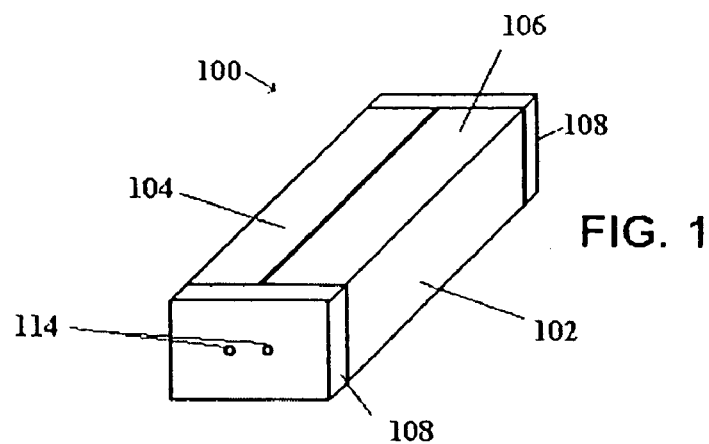
FIG. 1
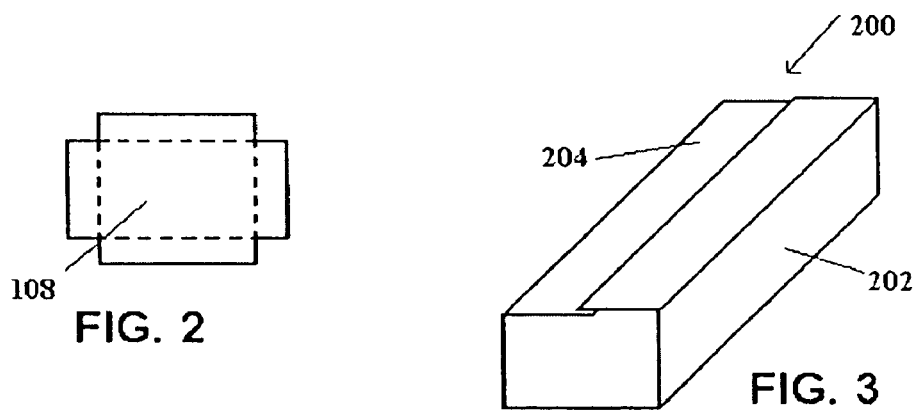
FIG. 2
FIG. 3
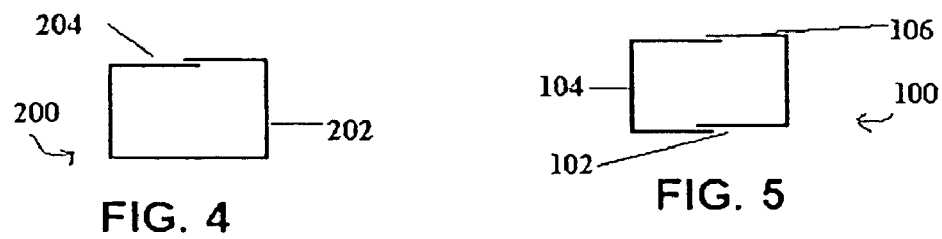
FIG. 4
FIG. 5

LIGHTWEIGHT, COMPOSITE STRUCTURAL RAILROAD TIES

CLAIM OF PRIORITY

This application claims priority to U.S. Provisional Patent Application No. 60/708,568 entitled "Lightweight, Composite Structural Railroad Ties," to Dustin K. Lane et al., filed Aug. 16, 2005, which is incorporated herein in full by reference.

BACKGROUND

1. Technical Field

The present invention relates generally to an apparatus and method for manufacturing prefabricated, lightweight, reinforced composite railroad ties, laid transversely and fastened to hold rails securely in position. The present invention further relates to an apparatus and method of recycling railroad ties already in use to make new railroad ties that can be stronger and weather-resistant without further creosote impregnation. The present invention further relates to manufacture of other structural components, for example telephone poles, bridge-building structural components, etc.

2. Related Art

Creosote-impregnated wooden railroad ties long have been the standard for railroad construction. Currently, due to environmental bans on creosote impregnation, the diminishing supply of wood, and wood conservation efforts, a need exists for a new, economical, uniform, easily-installed replacement for wood ties with superior quality and durability compared to conventional wood ties, and economical life-cycle costs. It will be desirable for any new railroad tie designs be adaptable to new construction ideas both related and unrelated to railroad uses, and automation, with design and manufacturing flexibility to meet new challenges as rail systems become more complex. The new ties must be strong, extremely durable, consistent in quality and adaptable to new rail design concepts. It is further desirable for any new railroad tie to be adaptable to use for other construction needs, economical, and favorable to conservation of resources.

SUMMARY

According to one aspect of the invention, a composite structural element is disclosed that can be used, for example, as a new railroad tie. The composite structural element is light-weight, relative to wood used for railroad ties. The lighter weight of the composite structural element will afford economical handling, shipping, and installation. Moreover, the composite structural element is more economical to manufacture than conventional wood railroad ties, and can be maintained in situ for continued safe and effective use.

The minimized weight of the composite structural element largely is attributable to the use of rigid polyurethane foam of substantial density inside an external containment housing (also referred to interchangeably as a "hollow frame" or simply "external containment"), where the foam equalizes the external stresses to be applied to the external containment, and is lighter than solid wood used in conventional railroad ties. The foam can be injected/sprayed into the external containment housing through holes in an end cap or both end caps at either end of the housing, or through small openings drilled through the housing into the interior of the housing. The foam also can be sprayed into the external containment housing around internal insertion blocks that can further reinforce the composite structural element. At least one of the internal insertion blocks can be made from substantial salvageable sections of wood selected from recycled railroad ties that are either in situ or that already have been removed for replacement. Alternatively, a reinforcement panel or several reinforcement panels can be positioned within the external containment housing. The reinforcement panels can be made of wood, for example, or other materials suitable for reinforcing the external containment housing. They can be used in place of or in addition to the insertion blocks. The external containment housing itself can be made of various different materials which are disclosed in detail herein, which materials further enhance the strength while maintaining the light weight of the composite structure of the invention.

The external containment housing, once filled with polyurethane foam, with or without at least one insertion block, is sprayed with a high solid coating, for example, in one preferred embodiment, with UV-resistant polyurea that also resists external forces on the composite structural element. Alternatively, the external containment housing in another preferred embodiment can be sprayed with a different high solid coating, for example, UV-stable aliphatic polyurethane coating that may be self-extinguishing (of fire or flames), and/or non-shrinking, or other similar coating. The result is a very strong, weather resistant, light-weight, composite structural component that can replace economically conventional railroad ties.

A method for manufacturing a composite structural element also is disclosed according to the invention. In the method, an initial step is to create an external containment housing. The external containment housing can be made from a two-piece shell as detailed herein. Internal insertion blocks can be added, that can be substantially a hollow of metal or a solid of wood for reinforcing the external containment housing. The internal insertion blocks alternatively can be made of substantial salvageable sections of wood from recycled conventional railroad ties that already have been removed for replacement, or that remain in situ. Reinforcement panels can be added along the length of the external containment housing. The reinforcement panels can be made, for example, of wood or other materials. The reinforcement panels can be used in place of or in addition to insertion blocks. The open ends of the external containment housing can be sealed in a sealing step with end caps in one embodiment, and the external containment housing can be injected in a filling step with a polyurethane foam of substantial density to unite and strengthen the entire structure, with or without internal insertion blocks. The foam can be injected through small openings in one or both end caps, or through small openings in the external containment housing, which small openings can be created in a drilling step. The foam injecting step can be carried out in several separate injecting steps, as where a central section of the external containment housing is separated from the ends of the external containment housing by the insertion blocks of wood or recycled ties, and as a result the entire external containment housing cannot be filled by a single injecting step. Alternatively, the several injecting steps can be carried out in a single injecting step where multiple injectors are used.

In an embodiment of the method where recyclable conventional ties are used to supply wood support blocks made of selected, salvageable wood, the method can include excavating the ground around where the tie to be recycled is seated, and then pulling the tie out. The tie to be recycled can be processed by, for example, cutting to create wood sections to be inserted into at least one external containment housing. The wood to be recycled thus can be used as a partial void filler and as reinforcement. A single recycled tie is expected to provide sufficient wood support blocks for numerous new lightweight composite ties according to the invention, depending upon the quality of the wood of the conventional tie to be recycled, and the size of the recycled wood blocks. For example, a conventional tie that measures ten feet in length can be cut into up to 10 segments that are one foot in length, and thus can accommodate five new ties according to embodiments of the present invention.

The new tie containing recycled, conventional tie wood then can be injected with foam as disclosed above, and finished as described below, to replace the old conventional tie. Alternatively, as an old conventional tie is removed for recycling, a pre-made new tie according to embodiments of the present invention can be inserted in its place, with wood recycling and new tie construction occurring later.

The filled structure then undergoes a sealing/coating step by uniformly coating the entire exterior of the structure with a high solid coating, for example, a UV-resistant polyurea or a UV-stable aliphatic polyurethane coating, wherein the UV-stable aliphatic polyurethane coating may be self-extinguishing (of fire or flames), and/or non-shrinking, or other similar coating. The polyurea or polyurethane coating also coats any small openings in the end caps, the external containment structure (i.e., openings used for foam injection), or both.

In one embodiment, line strips are created in an identifying step to indicate the proper placement of rails on the tie, i.e., the coated composite structural element. In a further embodiment to secure the rails to the coated composite structural element/railroad tie without the need for railroad spikes, the fixing step can be carried out by inserting bolts or screws. Plates with apertures therethrough can be used between the rail and the tie for reinforcement, and stakes or bolts can be applied through the apertures to fasten the plates to the exterior of the external containment structure. Where recycled wood or new wood blocks, or other reinforcement materials are used for internal reinforcement where the rails are to be placed on the tie, the stakes or bolts can be used to penetrate the wood. The length of the reinforcement materials—new wood, recycled wood, metal, etc. can be varied, and the positioning can be adjusted to be located at specific points, such as rail points for different railroad track needs, or other structural needs. Coating the structural element can be performed using the high solid coating (as disclosed above) to seal any breach in the structure that could expose the contents in the interior of the external containment housing to an external environment.

BRIEF DESCRIPTION OF THE DRAWINGS

Further details of the present invention are explained with the help of the attached drawings in which:

FIG. 1 shows a perspective view of components of a railroad cross tie according to the present invention.

FIG. 2 shows an end cap of FIG. 1 with dashed lines showing how the end cap is folded for attachment to the metal outer body of the railroad tie.

FIG. 3 shows a perspective view of the metal outer body of the railroad tie of FIG. 1.

FIG. 4 shows a cross-sectional view of the metal outer body from FIG. 3.

FIG. 5 shows the cross-sectional view of an alternative outer body.

DETAILED DESCRIPTION

Figure 6:
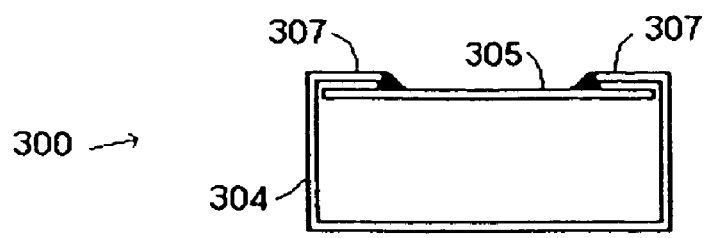
FIG. 6 shows the cross-sectional view of an alternative outer body.

FIG. 1 depicts a perspective view of components of an embodiment of a composite structural element 100, here, a railroad tie, according to the present invention. As seen in FIG. 1, the composite structural element 100 can include an external containment housing 102. The external containment housing 102 can comprise rectangular or cylindrical containers of steel, preferably of low-gauge, or other light-weight, rigid materials, such as cardboard of various weights, thicknesses, and densities; laminated high-density impregnated paper; extruded, welded, glued, or formed metal alloys; reactive, cast or formed and reinforced plastics and resins (including, but not limited to, fiberglass reinforced polyesters, polypropylene fabrics saturated with epoxy, plastics, or liquid rubber and then formed); high molecular weight polyethylene; thin structural plywood; and virtually any light-weight, economically-priced structural material.

In one embodiment 100 (FIGS. 1, 5), the external containment housing 102 can be made from two formed U-sections 104, 106 which can be joined to each other, for example by spot, stitch, or seam welding, continuous welds around the blocks and ends (FIG. 2, e.g.), rivets, glue, and the like, to form an elongated box-like structure, i.e., the external containment housing 102 (FIG. 1). The U-sections 104, 106 can be made from mild steel, in one embodiment of the composite structural element 100 of the invention. In another embodiment 200 (FIGS. 3, 4), the external containment housing 202 can be made using a single section 204 with only one weld attachment joint.

In a further embodiment 300 (FIGS. 6, 7), the external containment housing 302 can comprise a U-shaped section 304 and a top cap 305 shaped to close off the open, distal end of the U-shaped section 304 and thereby create a rectangular box. It should be noted that the embodiment of the composite structure of the invention is not limited to a rectangularly-shaped box. Rather, other shapes also are contemplated as within the scope of the present invention, such as a box that is triangulary- or cylindrically- shaped in cross-section. Both the U-shaped section 304 and the top cap 305 can be made of any of the materials disclosed above in connection with the external containment housing 302.

The two arms of the "U"-shape of the U-shaped section 304 each have, at their open, distal ends, a flexible lip 307. The top cap 305 also can have a flexible lip 307. Alternatively, the top cap 305 can be flat, or have two arms that are shorter relative to the two arms of the U-shaped section 304. The top cap 305 is positioned so that it closes off the open, distal end of the U-shaped section 304. The flexible lips 307 of the U-shaped section are made to rest flush against the top cap 305. The flexible lips 307 then are welded or otherwise joined with the top cap 305 as set forth above in connection with the two U-shaped sections 304, 306.

The open opposite ends of embodiment 300 (as opposed to the open top created by the distal ends of the arms of the U-shaped structure 304) can be closed with a flap 309 at both of the two open ends of the U-shaped section 304. The flaps 309 are flexible like a hinge so that they can be bent/folded to cover the open opposite ends of the U-shaped section 304. If the flaps 309 are connected with the bottom of the U-shaped structure 304, the flaps 309 each can be bent upwards toward the top cap 305 to close off the end of embodiment 300. Alternatively, if the flaps 309 are connected with an arm of the U-shaped structure 304, then the flaps 309 can be bent toward the opposite arm of the U-shaped structure 304 to close off the open opposite ends of the U-shaped structure 304. The flaps 309 then are welded so that there are no gaps between the flaps 309 and the top cap 305 and the flaps 309 and the U-shaped structure 304. The flaps 309 have lips 307 at each edge, and the lips are flexible in a hinge-like way, so that they can be bent flush and in contact with the top cap 305 and the U-shaped structure 304. The lips and top cap 305 and lips and U-shaped structure 304 can be welded or otherwise sealed as described above in connection with joining the two U-shaped structures 104, 106.

In the alternative, the top cap 305 can have a flap 309 at either end. The flaps 309 will have a lip 307 along each edge, and both of the flaps 309 can be folded down as described above to cover each of the open ends of the U-shaped structure 304. The lips 307 can be folded into place flush with and against the side arms and bottom of the U-shaped structure 304, and then joined as described above in connection with other joining means.

As a further alternative, embodiment 300 can have the two open ends sealed with end caps 308 as described herein. End caps 308 can be used either in addition to or as an alternative to the flaps 309 described above.

End caps 108 (FIG. 2) can be placed on ends of the external containment housing 102 (FIG. 1). The end caps 108 can be glued, welded, or otherwise sealed with rivets or any other sealing method that will enclose the contents of the external containment housing 102 sufficiently to protect the contents from exposure to an external environment. The end caps 108 further provide a sealed container with at least one small opening 114 (FIGS. 1, 9, 10, e.g.) only large enough for injection of a substantially dense, rigid polyurethane foam (see FIG. 14, element 317) that reacts in the external containment housing 102, filling it. It should be noted that the flaps 309 described above (FIGS. 6, 7) also can have small openings 314 as described, through which substantially dense, rigid polyurethane foam can be injected into the external containment housing 302. Without a substantially sealed container, the foam would expand out of the housing, losing some of its support strength, and preventing formation of a regularly-shaped structure using the foam. In one embodiment, at least two holes are provided to allow the escape of air from the external containment housing 102 while the foam is being injected.

Figure 11:
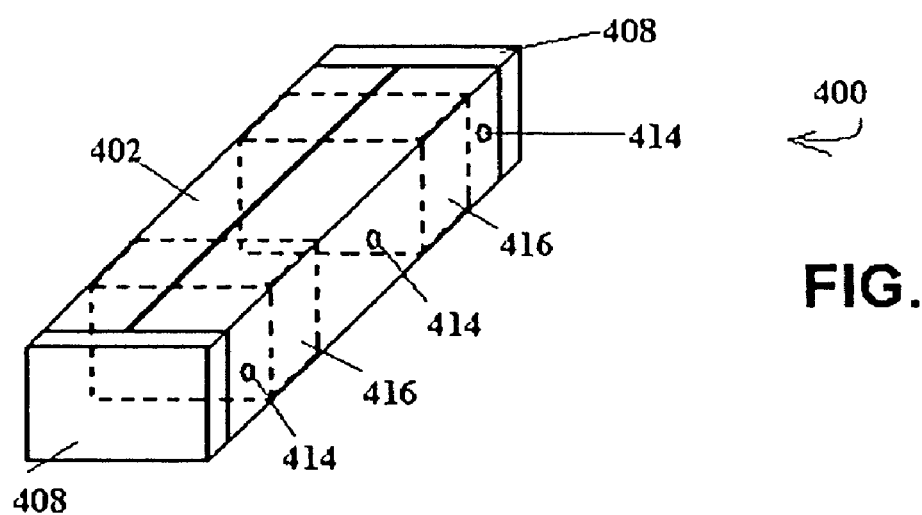
FIG. 11 is a perspective view illustrating how insertion blocks can be provided in the railroad tie to provide additional support for weight on the rails and for the railroad spikes used for attachment of the rails, and how additional foam injection holes are used to inject foam around the insert blocks.
Figure 12:
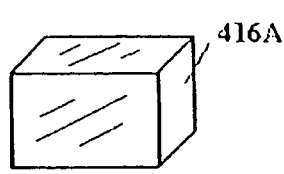
FIG. 12 shows a perspective view illustrating a wooden insertion block.
Figure 13:
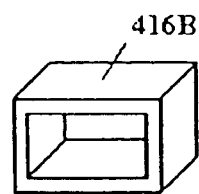
FIG. 13 shows a perspective view showing a hollow metal block used for an insertion block.
Figure 14:
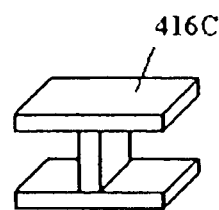
FIG. 14 shows a perspective view showing an I-beam used as an insertion block.
Figure 15:
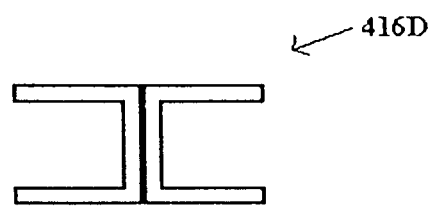
FIG. 15 shows a cross-sectional view of two C-sections forming an I-beam shape used as an insertion block in an embodiment of the apparatus of the disclosed invention.
Figure 16:
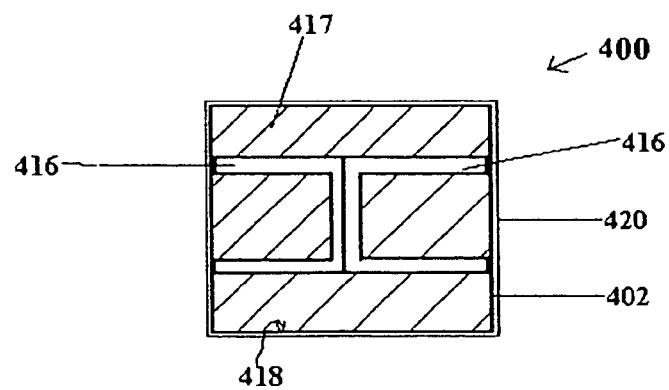
FIG. 16 shows a cross-section through a composite structure, perpendicular to a longitudinal axis of the composite structure, to depict the UV-resistant polyurea coating around the external containment housing, and the polyurethane foam and at least one insertion block inside the external containment housing.

The external containment housing 402 in one embodiment 400 (FIGS. 11-17) can contain at least one reinforcement insertion block 416. The insertion blocks 416 are inserted into the external containment housing 402 before injection of the foam, and can enable the external containment housing 402 to support substantially more weight in the area where the insertion blocks 416 are provided, than can be supported with foam alone inside the external containment housing 402. The insertion blocks 416 further can provide an attachment mechanism for the rails. The insertion blocks 416 can be, for example, light, internal metal frames and/or wood, and/or other materials (FIGS. 12-14). In one embodiment, the internal metal frames may be perforated. In one embodiment, two C-sections (also referred to as "U-shaped") of low-gauge steel are inserted inside the external containment. The C-sections may be configured to form an open-ended box-like configuration (FIG. 13). Alternatively, C-sections may be placed with an open side of each C-section facing outward, toward the external containment housing 402 (FIG. 15). As a further alternative embodiment of the insertion blocks 416, an I-beam can be inserted inside the external containment housing 402 (FIG. 14). Whichever configuration is applied, metal sections can be joined together by welding, such as spot or seam welding, by application of adhesive, rivets, screws, and the like. Other configurations also are contemplated for the internal structural elements, including but not limited to a honeycomb structure, or a pyramidal-shaped structure, and the like.

The insertion blocks 416 also can be constructed from wood, providing an attachment mechanism for railroad spikes that normally are used to attach to wood railroad cross ties (FIG. 12). In another aspect of the invention, the wood blocks (see, e.g., FIG. 12) can be made of substantial, salvageable sections of recycled wood selected from recycled conventional ties that have been removed from railroad tracks or recyclable ties that still are seated in railroad tracks but are in need of replacement or repair. Manufacturing new ties according to embodiments of the present invention from old conventional ties favors conservation of valuable resources and can be an economical alternative to using new wood blocks. Wood segments from old conventional ties can be placed inside the external containment housing 102, 202, 302, 402 to reinforce that structure where rails will be secured to the exterior, according to embodiments of the invention. Wood segments 416A (FIG. 12) also can be situated throughout a new tie according to embodiments of the invention. Substantially dense foam 417 can be injected as disclosed below, via several different injection sites to fill all voids left between the recycled wood blocks 416A inside the external containment housing 102, 202, 302, 402.

A single recyclable conventional tie can be recycled to make at least one, but likely more, railroad ties according to embodiments of the present invention. The number of new ties that can be made from a recycled conventional tie will depend upon the quality and size of the wood of the recycled tie, as well as the number of wood blocks 416A desired for each new tie.

Figure 17:
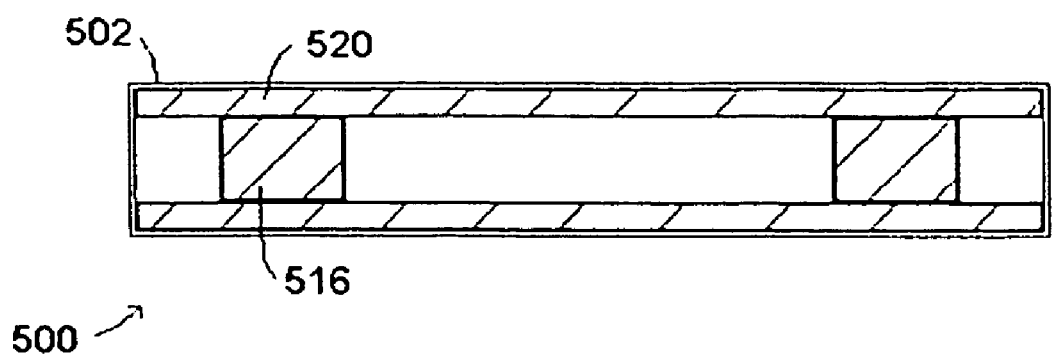
FIG. 17 is a top-down view of cross-section taken along a length of an embodiment of a composite structure according to the invention.

A further embodiment 500 of the invention is depicted in FIG. 17. In embodiment 500, a plank 520 of new wood or recycled wood is positioned along at least one of the two arms of the U-shaped structure 504. The planks 520 serve to increase the strength of the composite structure 500 so that it can withstand greater force and have increased endurance. The U-shaped structure 504 of embodiment 500 also can include at least one insertion block 516 substantially as disclosed above. Each such insertion block 516 can be sized to fit snugly against the planks 520 in the interior of the U-shaped structure 504. Embodiment 500 then can be filled with foam, substantially as described below. In this connection, the planks 520 may have at least one aperture therethrough to accept a nozzle for injecting substantially dense foam as disclosed above.

As noted above, all embodiments—i.e., embodiments either having or not having internal structural elements, e.g., 416, 520—are stabilized by substantially dense (i.e., low- to medium-density), rigid, reactive polyurethane foam which unifies the ties and equalizes stress from exterior sources. Note that although foam is referred to herein as 417, the references to foam and to other elements of the different embodiments apply to all embodiments 100-500. The foam 417 can be sprayed, injected, or poured into the external containment housing 102, 202, 302, 402, 502 to fill any empty spaces in the interior of the external. containment housing 102, 202, 302, 402, 502 and around the internal structural element(s) 416, if any, to unify all components in the interior with an interior surface 418 of the external containment housing. The foam 417 can be injected from a second, open end of the external containment housing 102, where a first end already 110 has been sealed with a first end cap 108. Alternatively, both ends 410, 412 of the external containment housing 402 can be capped with end caps 408 (FIG. 11), and the foam 417 instead can be injected into the interior of the external containment housing 402 through at least one small opening 414 made, for example, by drilling through the external containment housing 402 to the interior of the external containment housing 402. The use of "pour foam," which reacts relatively slowly, reduces the number of injection holes 414 needed to fill the internal containment structure 402 with foam 417, at least where no structural elements, e.g., 416, are included.

Where at least one internal structural element 416 is in the interior of the external containment housing 402, and the at least one internal structural element 416 is not solid (FIGS. 13-15), that internal structural element 416 also must be filled with foam. Therefore, in some embodiments of the invention, internal structural elements 416 with hollow spaces can include at least one small opening 414 positioned to allow foam filling of the internal structural element 416. FIG. 11 depicts an embodiment 400 wherein the internal structural elements 416 are of solid wood or other solid material (including recycled wood from conventional ties to be replaced), and the small openings 414 for foam filling are located along the external containment housing 402 at intervals that do not coincide with positioning of the internal structural elements 416. The holes 414 can be through a lateral surface of the external structural housing 402 or through a top or bottom surface. If the holes are through embodiment 500, the holes 514 also must pass through the planks 520, so that the foam 517 can pass through the planks 520 and into the interior of the external containment housing 502.

Once the foam has reacted and hardened, the exterior of the external containment housing 402 (reference is made to embodiment 400 but applies to all embodiments), is sprayed uniformly with a high solid protective coating 420. The high solid protective coating 420 can be, for example, a high-density, Ultraviolet ("UV")-stable aliphatic, or a UV-stable polyurea. For example, the coating may be a UV-stable aliphatic polyurethane coating that may be self-extinguishing (of fire or flames), and/or non-shrinking, or other similar coating. The high solid protective coating 420 can be used to seal any small openings including, but not limited to the apertures 414 drilled for filling the external containment housing 402 with foam, with or without having pre-sealed such drill openings 414. The coating further reinforces the seal of the endcaps 408.

For the embodiment of the structure that is to be used as a railroad tie, the two rail locations 422, 424 (FIGS. 8, 9) are identified accurately on a top side of the tie with, for example, line stripes in a contrasting color. The line stripes identify proper placement of rails (FIG. 8) on the tie where they can be secured by pressure plates 428 held to the tie by at least one railroad spike 430. These railroad spikes 430 can be held solidly in one embodiment by drilling at least one guide hole, although a guide hole may not be necessary. Installation with portable power tools can be rapid and accurate. The line stripes facilitate accurate tie placement horizontally and vertically with laser measurement. The railroad tie embodiment thus can be manufactured for a specific track placement need.

Alternatively, in another embodiment 100, (FIG. 10), bolts 134 can be used in place of railroad ties and screwed into the external containment housing 102 and through the foam 117. To allow bolts 134 to be screwed in, holes are tapped in the housing 102. Nuts 135 can be placed on the bolts 134 to secure the pressure plate 328 similar to use of the railroad spike 330 shown in FIGS. 8 and 9.

In another embodiment, recycled wood blocks made of selected, salvageable wood from conventional ties can be situated in the interior of the external containment housing 102, 202, 302, 402, 502 aligned on the inside with the location on the exterior of the external containment housing 102, 202, 302, 402 where the rails will be secured.

The composite structure described above can be used as a fabricated tie that will be lighter than its wooden counterpart, which will afford economic benefit in handling, shipping and installation. The composite structure further can be used as any other appropriate type of structural component, as for example, in building docks, telephone poles, bridges, etc. The fabricated tie in the present embodiment is in a standard rectangular shape. However, in other embodiments the ties may be manufactured in other shapes in accordance with new railroad concepts which may employ different tie designs. Other uses are contemplated for the composite structure of the present invention, such as use for telephone poles, bridge-building elements, dividers, barriers, building blocks, guard rails, and the like, which uses may call for alternative shapes, such as cylindrical shapes or forms that are pyramidal in cross-section, for example.

Bedding and placement of the ties is similar to conventional methods. However, the tie may be flattened or made with fins to accommodate heavy ballasting where required. Additionally, the tie may accommodate tie-downs and other restraints where needed.

During construction of the rail line, the bed will be graded, ballasted and leveled as the ties are laid under laser direction. The rails will be similarly placed and fastened. The fastening will be exact as the pressure plates are screwed down on the rails and tie with a portable power tool to the proper torque. This attachment may be surface-sealed by a high solid protective coating as disclosed above, to prevent deterioration and/or corrosion (spray masked to prevent unwanted overspray on the plate/rail connection).

The unique concept of the present invention creates a lightweight composite structure that in at least one embodiment can be a precise tie system for railway construction. Flexible in concept, manufacture, and fabrication, the ties will assist in the creation of durable, long-lived rail systems with low maintenance. Periodic maintenance will replace periodic replacement of the system to reduce operating costs dramatically.

Figure 18A:
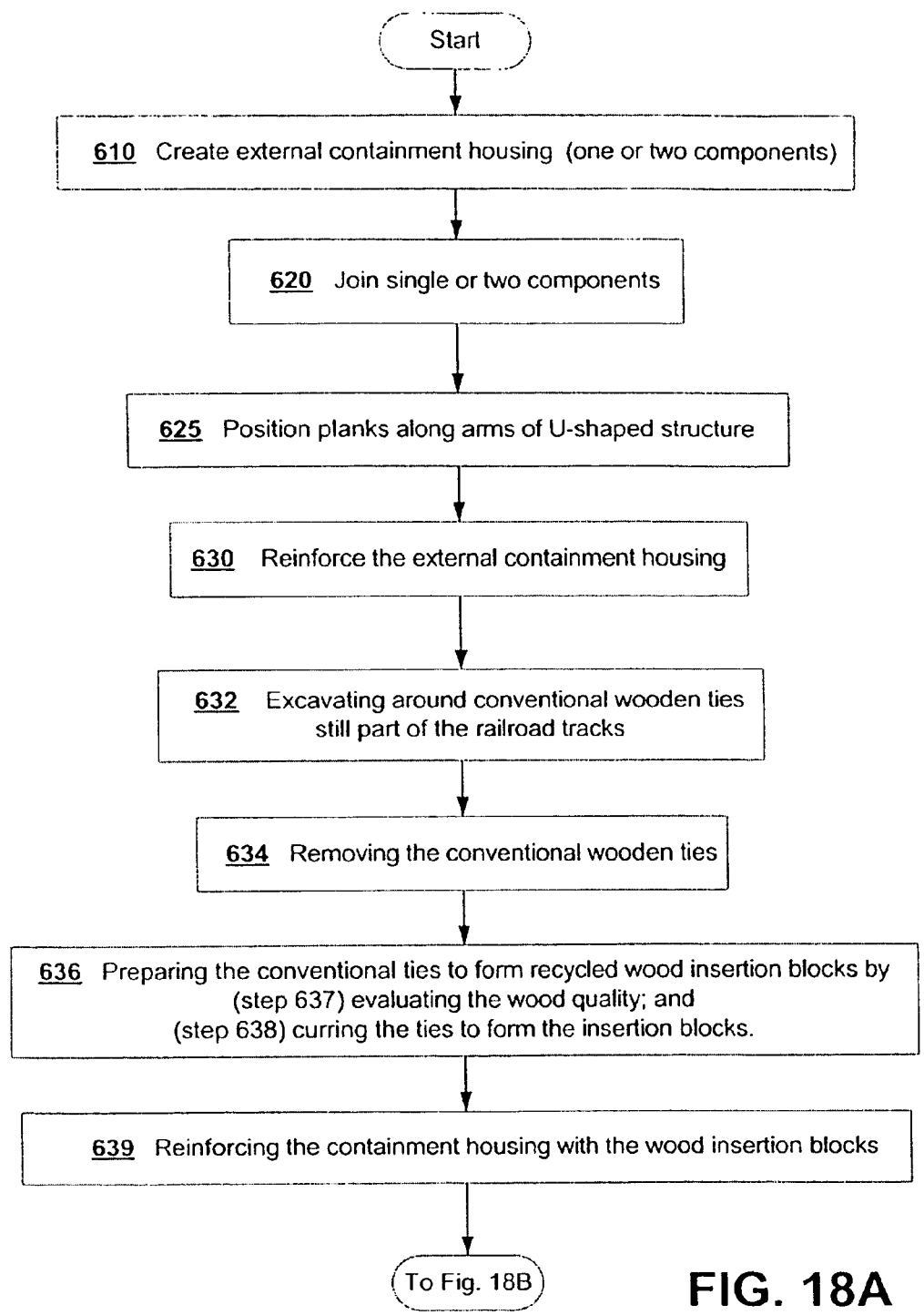
FIGS. 18A and 18B provide a flow chart of a method of manufacture of the disclosed invention.
Figure 18B:
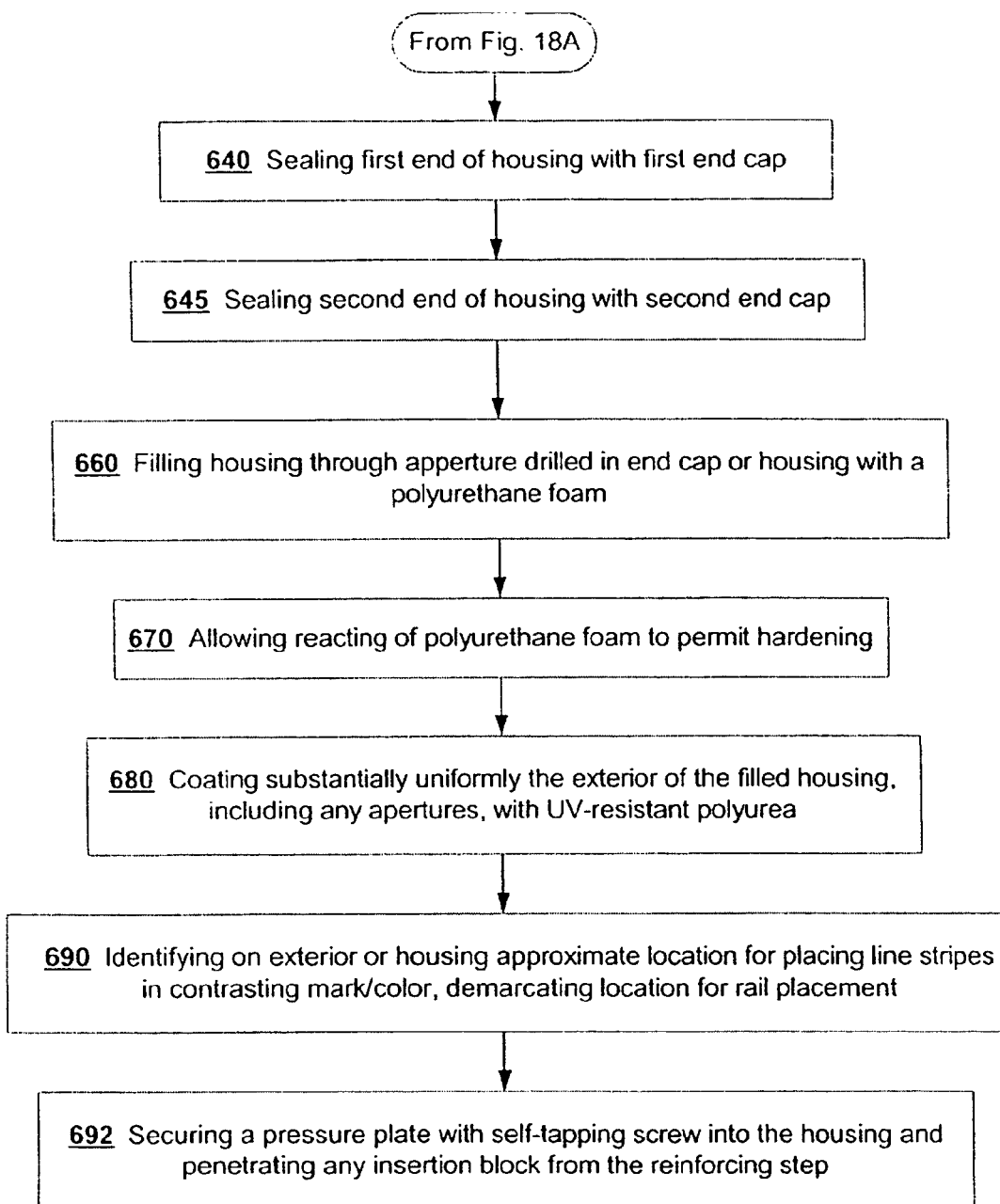

Also disclosed herein is a method 600 (FIGS. 18A and B) of manufacturing a composite structural element according to the invention. For convenience, only embodiment 400 will be referenced hereinafter; however, one of ordinary skill in the art will appreciate that the steps of method 600 disclosed herein can apply to any of the embodiments of the present invention.

In method 600, an initial step 610 is creating an external containment housing 402. The external containment housing 402, as disclosed above, can comprise at least one elongated metal component that can be configured into a box shape, or other shape, such as a cylinder, or triangular cylinder with a triangular cross-section, and the like. Additional materials as disclosed above in connection with the external containment housing 402 also can be used. A joining step 620 seals the single metal component into an elongated box shape with two open ends, or joins two metal components together into an elongated box shape with two open ends. As disclosed above, the two metal components can be two U-shaped sections such as 104 and 106. Alternatively, they can comprise a top cap 305 joined to the open top of a U-shaped section 304. The distal ends of the arms (i.e., the ends at the open end) of the U-shaped section 304 have lips 307 that are flexible in a hinge-like manner, that can be bent or folded to lie flush against the top cap 305. The lips 307 of the arms of the U-shaped structure 304 then can be joined with the top cap 305 in a joining step 620. Two U-shaped sections 104, 106, alternatively, can be joined in the joining step 620 by joining the regions where the two U-shaped sections 104, 106 are caused to overlap (see FIG. 5). The joining step 620 can be performed by spot, stitch, or seam welding, application of adhesives, riveting, and the like.

Either before or after the joining step 620 described above in connection with assembling or creating the external containment housing 420, a plank positioning step 625 can be taken. In the plank positioning step 625, also described as a first reinforcement step, planks 520 can be positioned along the arms of the U-Shaped structure 404 or along the sides of structures made with two U-shaped structures (see e.g., FIG. 5, 104, 106), or along the sides of other structures having other shapes, such as triangular elongated box, etc. The planks 520 in the plank positioning step 625 can be used for reinforcement of the external containment housing of any of the embodiments described herein, and other embodiments contemplated and encompassed by this disclosure. These planks 520 can be made from new wood or from salvageable recycled wood selected from old ties or other source, as described in greater detail below.

Either with or without planks 520 positioned in the external containment housing of any embodiment of the present invention, insertion blocks 416 can be inserted in the method of the invention, for additional reinforcement of the composite structural element. At least one insertion block 416 (see FIGS. 11-17) may be inserted, in a second reinforcing step 630, into the external containment housing 402 to reinforce the composite structural element 400 where the weight of the rails and forces on the rails are intended to fall. The reinforcing step 630 can occur prior to the joining step 620, i.e., before the open-ended elongated box shape is formed, or after the joining step 620, i.e., the insertion block(s) 416 can be inserted after the open-ended elongated box shape of the external containment housing 402 is sealed. If first reinforcement step 625 is carried out, and planks 520 are positioned in the external containment housing, then the second reinforcement step 630 can occur after step 625, i.e., the insertion block(s) 416 can be inserted after the planks 520 are positioned in the interior along the sides of the external containment housing. As a further alternative, the at least one insertion block 416, if any, can be inserted during a reinforcing step 630 that occurs after a first end of external containment housing 402 is sealed in an end-capping step 640, as disclosed herein below.

One of ordinary skill in the art will appreciate that the number of insertion blocks 416 of any material will depend upon how many such insertion blocks 416 will be used in each new composite tie. As disclosed above, the number may be as few as one, and may number two or more, which number will be limited for example by the size of the insertion blocks 416 and the length of the new composite tie. The number of insertion blocks 416 also can vary with the need for multiple track systems. Further, one of ordinary skill in the art will appreciate that the insertion blocks 416 can vary in length, and that also that some embodiments can have multiple insertion blocks 416 that vary in length.

In a further aspect of the present invention, the first and second reinforcing steps 625, 630 may further include or be preceded by other steps involving obtaining and using recycled salvageable wood selected from conventional railroad ties that have been removed from railroad tracks, or that are intended to be removed and replaced. In one embodiment, where the conventional tie to be recycled has not yet been removed from the railroad tracks, the reinforcing steps 625, 630 can be preceded by the steps of: recycling a wooden conventional railroad tie by excavating around a conventional wooden tie that still is part of railroad tracks 632; removing the conventional wooden railroad tie from the track 634; preparing 636 recycled wood from the conventional tie for insertion blocks 416; reinforcing 639 the new, composite railroad tie as disclosed for steps 625, 630, above. The preparing step 636 can include further steps of evaluating the quality of the recycled wood 637 and cutting appropriately sized pieces 638 from acceptable recycled wood for insertion blocks 416.

Alternatively, where the conventional tie to be recycled already has been removed from the railroad tracks, the reinforcing steps 625, 630 can include the step of obtaining the recycled wood from the conventional tie 631; and preparing 636 wooden insertion blocks 416. As above, the preparing step 636 can include further steps of evaluating the quality of the recycled wood and cutting appropriately sized pieces from acceptable recycled wood for insertion blocks 416.

Once the external containment housing 402 is formed into an open-ended box, or other shape of containment housing for otherwise-fashioned embodiments of the present invention, an end-capping step 640 can be carried out. In the end-capping step 640, a first end cap 408 can be sealed onto a first end of the external containment housing 402. A second end-capping step 645 then can be carried out to seal the second open end 412 of the external containment housing 402 with a second endcap 408 to form a sealed container.

Figure 7:
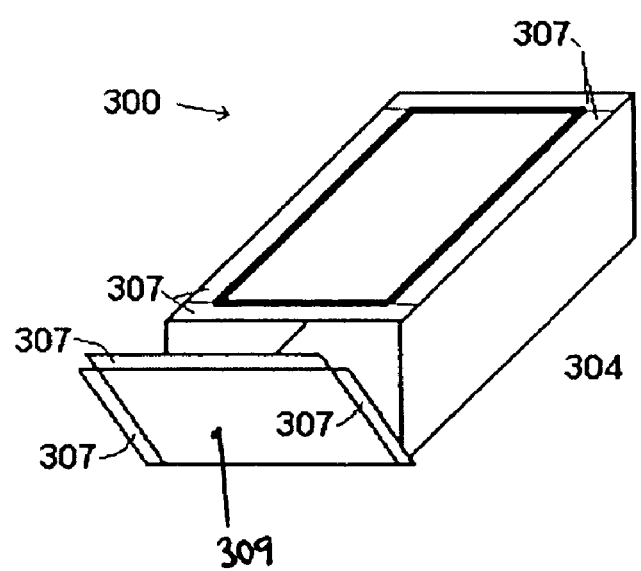
FIG. 7 shows a perspective view of the alternative outer body depicted in FIG. 6.

The end-capping step 645 alternatively can include bending/folding flap 309 as in FIGS. 6, 7, so that if covers the open end of the external containment housing 302. The lips 307 of the flap 309 then can be bent/folded so that they lie flush with the sides of the external containment housing 302, and can be joined by welding, riveting, etc. to the external containment housing 302. It will be appreciated by one of ordinary skill in the art that the flaps 309 include at least one aperture for accepting a nozzle for a foam injection step as described in detail below.

Foam injection in step 660 can occur after a second endcapping step 645, through at least one small opening 414 in the second end cap 408. As disclosed above, it is preferable to have at least two small openings 414, with at least one small opening 414 in the end cap 408, and at least one other small opening 414 either on the same end cap 408 or elsewhere on the surface of the external containment housing 402, to allow air to escape as filling occurs, and thus to facilitate filling 660 of the interior of the external containment housing 402. It will be appreciated by one of ordinary skill in the art that if planks 520 are inserted in a first reinforcing step 625, the holes will have to penetrate the planks 520 to permit the foam injection step 660. During the foam injection step 560, the substantially dense polyurethane foam is sprayed or injected into an interior of the external containment housing 402 and allowed to react and harden.

It is appreciated that the filling step 660 from the second open or capped end may be preferable in embodiments where no insertion blocks 416 are used (embodiments 100, 200, e.g.), because insertion blocks 416 are likely to impede complete filling 660 back to the first closed end 410 of the external containment housing 402 in embodiment 400. Where insertion blocks 316 are used, the filling step 660 can take place along segments of the external containment housing 402 where the insertion blocks 416 are not aligned and therefore will not impede filling step 660. For example, where insertion blocks 416 are situated inside either end of the external containment housing 402, for example underneath where the rails will align with the tie, cavities to be filled with foam will be located between each insertion block 416 and each end of the external containment housing 402, and also between the two insertion blocks 416. Accordingly, holes 414 for filling can be located along the exterior of the external containment housing 402 that coincides with such cavities.

In an embodiment 400, where at least one insertion block 416 is added in the reinforcing step 630, the foam injection step 660 can occur after both ends of the external containment housing 402 are capped by a first endcapping step 640 and a second endcapping step 645, wherein the filling step 660 can occur by foam injection through at least one small opening 414 drilled through the external containment housing 402. The end caps 408 need not have small openings 414 through them. Instead, at least one, and preferably at least two, small openings 414 can be drilled, during a drilling step 650, at positions through the external containment housing 402 and if necessary, through plank 520. Alternatively, plank 520 may have holes 514 pre-drilled to align with apertures in the external containment housing so that the plank 520 can accept a foam injecting nozzle inserted into the external containment housing for the foam injecting step 660. Where a solid wood block insertion block 416A (FIG. 14) has been inserted in a reinforcing step 630, the small opening(s) 414 should not be drilled during a drilling step 660 through the external containment housing 402 in a position corresponding to the location(s) of the solid wooden insertion block(s) 416A. For other insertion blocks 416B, 416C, 416D having hollow spaces that are continuous with the interior of the external containment housing 402 (FIGS. 13-16), the small openings 414 can be drilled through the containment housing 402 at any point, including any position that overlaps with the insertion block (s) 416. Again, any drilling may need to encompass drilling through a plank 520, unless the plank 520 has pre-drilled apertures.

Once the small opening(s) 414 are drilled during the drilling step 650, the filling step 660 can be carried out. Once the interior of the external containment is filled with substantially dense polyurethane foam, as disclosed above, the foam is allowed to react, in a reacting step 670, and to harden. In reacting and hardening, the foam stabilizes the composite structure and unites any internal components (insertion blocks 416, etc.) with each other and with the interior surface 418 of the external containment structure 402 for overall strength.

The external surface of the external containment housing 402 is then coated in a coating step 680. The coating step 680 comprises spraying a substantially uniform coat of high-solid coating, such as UV-resistant aliphatic polyurea. In another embodiment, the high solid coating can be a UV-stable aliphatic polyurethane coating that may be self-extinguishing (of fire or flames), and/or non-shrinking, or other similar coating, over the exterior of the external containment housing 402, using techniques that are known in the art. The coating step 680 can fill in and coat any small openings 414 on the external containment housing 402 and on the endcaps 408.

Figure 8:
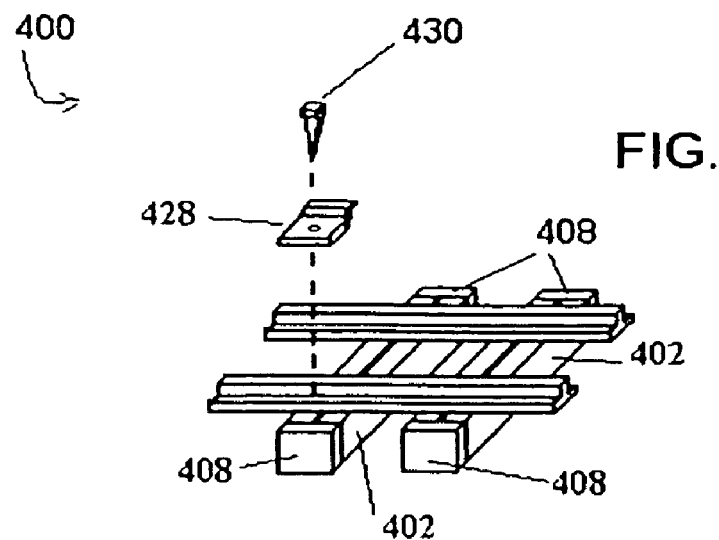
FIG. 8 shows a perspective assembly view of railroad ties with rails being attached to the ties by an attachment plate and railroad spike.
Figure 9:
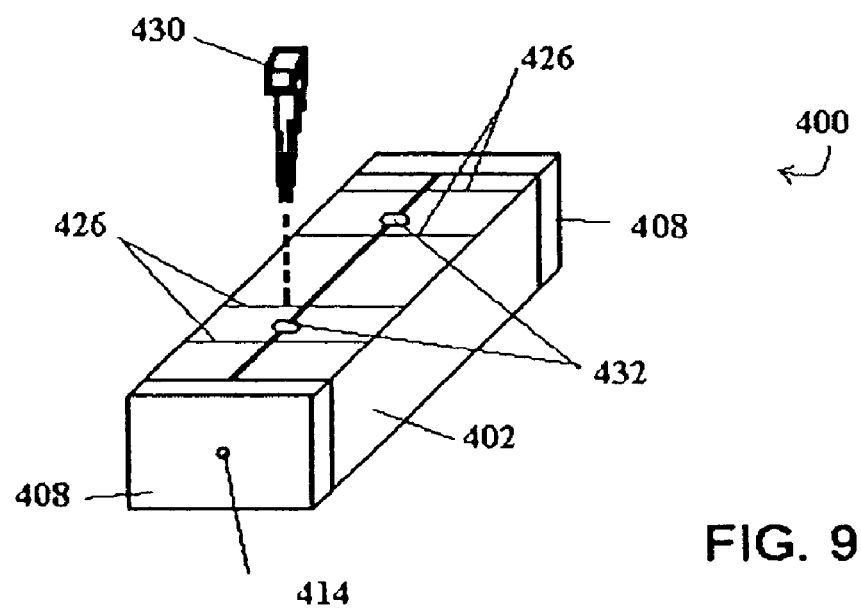
FIG. 9 is a perspective view illustrating how guide holes can be provided in the metal outer body of the railroad tie for driving in the railroad spike.
Figure 10:
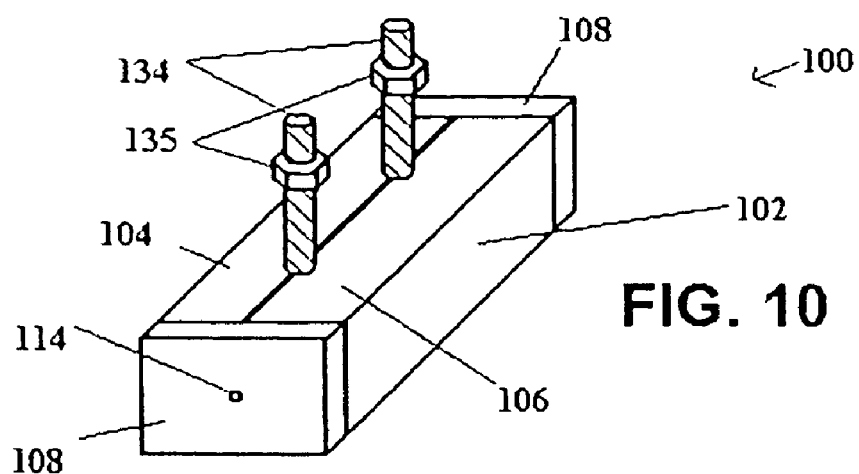
FIG. 10 is a perspective view illustrating how bolts can be screwed into the outerbody and through the interior foam of the railroad tie.

Line stripes in one embodiment are next identified during an identifying step 690 on a top side of the coated composite structure (FIGS. 8-9). The line stripes identify where the rails of the railway are to be positioned on the railroad tie of the present invention. In a securing step 692, pressure plates 428 (FIG. 8) can be secured to the tie by self-tapping screws 430 (FIGS. 8-9) into the tie from the top side 426 (FIG. 9). Installation with portable power tools will be rapid and accurate. Any areas on the coated tie that have been penetrated by screws, rivets, and the like, and can re-sprayed with polyurea in a subsequent coating step 680, to ensure that the external containment housing is sealed from the external environment which can cause degradation of the internal materials. This subsequent coating step further encapsulates and isolates any contaminants.

Although the present invention has been described above with particularity, this was merely to teach one of ordinary skill in the art how to make and use the invention. Many additional modifications will fall within the scope of the invention, as that scope is defined by the following claims.

What is claimed:

1. A composite structural element comprising:
   a hollow flame made from a rigid material, said hollow flame having an interior, and an exterior, wherein the hollow flame is an elongated rectangular box, and wherein the hollow flame further comprises:
      a single U-shaped section comprising:
         an open side;
         a closed bottom surface;
         a first arm; and
         a second arm substantially parallel to the first arm, the first arm and second arm connected with and perpendicular to the closed bottom surface;
      a top section positioned over the open side substantially parallel to the closed bottom surface and joined with the first arm and the second arm;
      a first flap which is an extended portion of a first end of one of the first arm, the second arm, and the closed bottom surface, and bendably correspondingly connected with the first end of one of the first arm, the second arm, and the closed bottom surface, the first flap bending into position to cover and seal the first end of the hollow frame;
      a second flap which is an extended portion of a second end of one of the first arm, the second arm, and the closed bottom surface, and bendably correspondingly connected with the second end of one of the first arm, the second arm, and the closed bottom surface, the second flap bending into position to cover and seal the second end of the hollow frame;

a polyurethane foam that reacts and becomes rigid in the interior such that the polyurethane foam completely fills open portions of the interior; and a substantially uniform high-solid protective coating provided over the exterior of the hollow frame.

2. The composite structural element as in claim 1 wherein the composite structural element is a railroad tie.

3. The composite railroad tie as in claim 1, wherein the hollow frame is an elongated rectangular box, and the hollow frame further comprises two U-shaped sections joined together.

4. The composite structural element as in claim 1 wherein the hollow frame is made of a material selected from the group consisting of steel, low-gauge steel, cardboard, impregnated paper, extruded metal alloys, welded metal alloys, glued metal alloys, formed metal alloys, polypropylene plastic, resin, fiberglass-reinforced polyesters, polyester fabrics saturated with epoxy, plastics or liquid rubber, and thin structural plywood.

5. The composite structural element as claimed in claim 1 wherein the composite structural member further comprises:

at least one reinforcing member comprising a rigid material, said at least one reinforcing member placed in the interior adjacent the polyurethane foam to provide support to the hollow frame.

6. The composite structural element as in claim 5 wherein the at least one reinforcing member comprises at least one plank of wood.

7. The composite structural element as in claim 5 wherein the at least one reinforcing member further comprises at least one I-beam having a length substantially shorter than a length of the hollow frame.

8. The composite structural element as in claim 5 wherein the at least one reinforcing member further comprises at least one hollow box.

9. The composite structural element as in claim 5 wherein the at least one reinforcing member further comprises a first C-section and a second C-section, wherein a first closed end of the first C-section abuts a second closed end of the second C-section, and the first closed end and the second closed end are joined together.

10. The composite structural element of claim 5, further comprising:

at least one aperture from the exterior through to the interior, said aperture adapted to accommodate an injection nozzle for providing the polyurethane foam to the interior, said aperture having a size that accommodates the injection nozzle.

11. The composite structural element of claim 5, wherein the high solid protective coating is a UV-resistant polyurea.

12. The composite structural element of claim 5, wherein the high solid protective coating is a UV-stable aliphatic polyurethane coating, wherein the UV-stable aliphatic polyurethane coating.

13. The composite structural element of claim 12 wherein the UV-stable aliphatic polyurethane coating is self-extinguishing of fire, and is non-shrinking.

14. The composite railroad tie of claim 5, wherein the at least one reinforcing member is positioned to securely attach at least one railroad spike.

15. The composite structural element as in claim 1 wherein the first flap bends into position to form a first end cap, and wherein the second flap bends into position to form a second end cap, the composite structural element further comprising:

at least one aperture in at least one of the first end cap and the second end cap, the at least one aperture adapted to accommodate an injection nozzle for providing the polyurethane foam to the interior.

16. A composite structural element comprising:

a hollow frame made from a rigid material, said hollow frame having an interior, and an exterior, said hollow frame further comprising:

a single U-shaped section further comprising:

an open side;

a closed bottom surface;

a first arm; and a second arm substantially parallel to the first arm, the first arm and second arm connected with and perpendicular to the closed bottom surface; and a top section positioned over the open side substantially parallel to the closed bottom surface and joined with the first arm and the second arm;

a first flap which is an extended portion of a first end of one of the first arm, the second arm, and the closed bottom surface, and bendably correspondingly connected with the first end of one of the first arm, the second arm, and the closed bottom surface, the first flap bending into position to cover and seal the first end of the hollow frame;

a second flap which is an extended portion of a second end of one of the first arm, the second arm, and the closed bottom surface, and bendably correspondingly connected with the second end of one of the first arm, the second arm, and the closed bottom surface, the second flap bending into position to cover and seal the second end of the hollow frame;

at least one insertion block in the interior, the insertion block adapted to comprise a support of the hollow frame in at least one part where pressure is to be applied;

a plank of wood positioned along the interior of the first arm and the second arm;

a plurality of apertures through the hollow frame and the planks of wood to allow injection of a polyurethane foam;

the polyurethane foam that reacts and becomes rigid in the interior and completely fills the interior of the hollow frame apart from the at least one insertion block; and a substantially uniform high-solid protective coating provided over the exterior of the hollow frame.

* * * * *